United States Patent
Parkinson et al.

(10) Patent No.: US 8,498,411 B1
(45) Date of Patent: *Jul. 30, 2013

(54) USING MULTIPLES ABOVE TWO WITH RUNNING TOTALS AND REFERENCE VALUES OTHER THAN 0 AND 2^ (WINDOW SIZE) IN ELLIPTIC CURVE CRYPTOGRAPHY SCALAR MULTIPLICATION ACCELERATION TABLES

(75) Inventors: Sean Parkinson, Indooroopilly (AU); Mark Hibberd, Boondall (AU); Peter Alan Robinson, Enoggera Reservoir (AU); David Paul Makepeace, Middle Park (AU)

(73) Assignee: EMC Corporation, Hopkinton, MA (US)

( * ) Notice: Subject to any disclaimer, the term of this patent is extended or adjusted under 35 U.S.C. 154(b) by 812 days.

This patent is subject to a terminal disclaimer.

(21) Appl. No.: 12/569,280

(22) Filed: Sep. 29, 2009

Related U.S. Application Data

(60) Provisional application No. 61/122,125, filed on Dec. 12, 2008, provisional application No. 61/122,116, filed on Dec. 12, 2008, provisional application No. 61/122,120, filed on Dec. 12, 2008, provisional application No. 61/122,131, filed on Dec. 12, 2008.

(51) Int. Cl.
*H04L 9/00* (2006.01)

(52) U.S. Cl.
USPC .............. 380/30; 713/174; 713/172; 713/168

(58) Field of Classification Search
None
See application file for complete search history.

(56) References Cited

U.S. PATENT DOCUMENTS

| | | | |
|---|---|---|---|
| 6,263,081 B1 | 7/2001 | Miyaji et al. | |
| 7,110,538 B2 * | 9/2006 | Gallant et al. | 380/28 |
| 7,412,062 B2 | 8/2008 | Lambert et al. | |
| 7,724,898 B2 | 5/2010 | Naslund et al. | |
| 7,991,154 B2 * | 8/2011 | Longa et al. | 380/30 |
| 8,204,232 B2 | 6/2012 | Struik et al. | |
| 2007/0064932 A1 * | 3/2007 | Struik et al. | 380/30 |

OTHER PUBLICATIONS

Robinson et al., "Elliptic Curve Cryptography Scalar Multiplication with On Demand Acceleration Table Generation," U.S. Appl. No. 12/569,284, filed Sep. 29, 2009.
Robinson et al., "Size Optimization for Large Elliptic Curve Cryptography Scalar Multiplication Acceleration Tables," U.S. Appl. No. 12/633,400, filed Dec. 8, 2009.
Makepeace et al., "Using Multiples Above Two with Running Totals in Elliptic Curve Cryptography Scalar Multiplication Acceleration Tables," U.S. Appl. No. 12/633,395, filed Dec. 8, 2009.

(Continued)

*Primary Examiner* — Pramila Parthasarathy
(74) *Attorney, Agent, or Firm* — BainwoodHuang

(57) ABSTRACT

A method, integrated circuit chip, and computer program product for cryptographically processing an input value with Elliptic Curve Cryptography (ECC) using ECC scalar multiplication are provided. The ECC scalar multiplication is performed with the use of an enhanced acceleration table (EAT). The EAT uses multiple running totals with multiples above 2. The EAT, in some embodiments, uses reference values other than 0 and 2^window size.

22 Claims, 3 Drawing Sheets

OTHER PUBLICATIONS

Robinson et al., "Optimizing Algorithm for Large Elliptic Curve Cryptography Scalar Multiplication Acceleration Tables," U.S. Appl. No. 61/122,116, filed Dec. 12, 2008.

Makepeace et al., "Using Multiples Above Two with Running totals in Elliptic Curve Cryptography Scalar Multiplication Acceleration Tables," U.S. Appl. No. 61/122,120, filed Dec. 12, 2008.

Parkinson et al., "Using Reference Values Other Than 0 and 2 (Window Size) in Elliptic Curve Cryptography Scalar Multiplication Acceleration Tables," U.S. Appl. No. 61/122,125, filed Dec. 12, 2008.

Robinson et al., "Fast to Generate Elliptic Curve Cryptography Scalar Multiplication Acceleration Tables," U.S. Appl. No. 61/122,131, filed Dec. 12, 2008.

U.S. Department of Commerce/National Institute of Standards and Technology, "Digital Signature Standard (DSS)," Federal Information Processing Standards Publication, FIPS PUB 186-2, Jan. 27, 2000, 72 pages.

López et al., "An Overview of Elliptic Curve Cryptography," Relatório Técnico IC-00-10, May 2000, pp. 1-34.

* cited by examiner

USING MULTIPLES ABOVE TWO WITH RUNNING TOTALS AND REFERENCE VALUES OTHER THAN 0 AND 2^ (WINDOW SIZE) IN ELLIPTIC CURVE CRYPTOGRAPHY SCALAR MULTIPLICATION ACCELERATION TABLES

CROSS REFERENCE TO RELATED APPLICATIONS

This patent application claims the benefit under 35 U.S.C. §119(e) of U.S. Provisional Patent Application No. 61/122,125 filed on Dec. 12, 2008, entitled, "USING REFERENCE VALUES OTHER THAN 0 AND 2^(WINDOW SIZE) IN ELLIPTIC CURVE CRYPTOGRAPHY SCALAR MULTIPLICATION ACCELERATION TABLES," the contents and teachings of which are hereby incorporated by reference in their entirety. This patent application claims the benefit under 35 U.S.C. §119(e) of U.S. Provisional Patent Application No. 61/122,116 filed on Dec. 12, 2008, entitled, "OPTIMIZING ALGORITHM FOR LARGE ELLIPTIC CURVE CRYPTOGRAPHY SCALAR MULTIPLICATION ACCELERATION TABLES," the contents and teachings of which are hereby incorporated by reference in their entirety. This patent application claims the benefit under 35 U.S.C. §119(e) of U.S. Provisional Patent Application No. 61/122,120 filed on Dec. 12, 2008, entitled, "USING MULTIPLES ABOVE TWO WITH RUNNING TOTALS IN ELLIPTIC CURVE CRYPTOGRAPHY SCALAR MULTIPLICATION ACCELERATION TABLES," the contents and teachings of which are hereby incorporated by reference in their entirety. This patent application claims the benefit under 35 U.S.C. §119(e) of U.S. Provisional Patent Application No. 61/122,131 filed on Dec. 12, 2008, entitled, "FAST TO GENERATE ELLIPTIC CURVE CRYPTOGRAPHY SCALAR MULTIPLICATION ACCELERATION TABLES," the contents and teachings of which are hereby incorporated by reference in their entirety. This patent application is related to the U.S. patent application entitled "ELLIPTIC CURVE CRYPTOGRAPHY SCALAR MULTIPLICATION WITH ON-DEMAND ACCELERATION TABLE GENERATION," filed on even date herewith by Peter Alan Robinson, David Paul Makepeace, and Jaimee Brown.

BACKGROUND

Public key cryptography is a technique for protecting communications or authenticating messages. Using this technique, electronic devices wishing to transmit information amongst themselves each possess a public key and a private key. Each electronic device's private key is kept by that electronic device as a secret from all other electronic devices. Each electronic device's public key may be widely distributed amongst other electronic devices. Each corresponding public key and private key are related mathematically, but the private key cannot be practically derived from the public key. In use, for example, a first electronic device wishing to send an encrypted message to a second electronic device first encrypts the message with the second electronic device's public key. The first electronic device then forwards the encrypted message to the second electronic device. Upon receiving the encrypted message, the second electronic device decrypts the message with the second electronic device's private key.

One way of creating public and private keys is through the use of Elliptic Curve Cryptography (ECC). ECC incorporates a group of points on an elliptic curve defined over a finite field in the production of public and private keys. ECC is useful for defining the relationship between public and private keys because there is no sub-exponential algorithm known to solve a discrete logarithm problem on a properly chosen elliptic curve. The lack of such a known algorithm ensures that a private key cannot be practically derived from its corresponding public key. The performance of ECC depends on the speed of finite field operations and scalar multiplication and the choice of curve and finite field. While there is a standard type of elliptic curve equation, there are many different elliptic curves. They are distinguished by the values of their coefficients and the finite field over which they are defined.

Curves in common use are standardized by organizations such as the National Institute of Standards and Technology (NIST) and American National Standards Institute (ANSI). These standardized curves are given names and are referred to as named curves. Despite being called named curves, they actually define an elliptic curve group. An elliptic curve group is defined by an operation that can be applied to points on an elliptic curve, referred to as point addition, together with a set of points on the curve. This set of points is defined such that, given a point on the elliptic curve (i.e., a base point, or a generator point), all points in the set can be obtained by successive application of the point addition operation to the base point. The elliptic curve group includes the point at infinity which is the additive identity of the group. The number of points in the elliptic curve group is called the order. An example named curve is P256, which is defined in NIST's Digital Signature Standard issued on Jan. 27, 2000 as FIPS 186-2, the contents and teachings of which are hereby incorporated by reference in their entirety. Other examples of named curves include B283, K283, B409, K409, P384, B571, K571, and P521.

ECC scalar multiplication is the multiplication of a point on the elliptic curve by a scalar. While ECC scalar multiplication can be described in terms of successively applying point addition, there are techniques available that allow a scalar multiplication to be performed more quickly. ECC scalar multiplication can be accelerated by pre-generating multiples of the point to be multiplied. This set of pre-generated values is called an acceleration table. Acceleration tables are made up of sub-tables, each sub-table being used to calculate a partial result for a subset window size bits in length of the scalar.

SUMMARY

Unfortunately, there are deficiencies to the above-described conventional approach to ECC scalar multiplication. In particular, an acceleration table can get quite large, requiring large amounts of storage space. Furthermore, large acceleration tables cannot fit entirely within the cache of a microprocessor, thus requiring frequent swapping to and from memory, which can slow performance.

An improved technique involves reducing the size of the acceleration table by reducing the number of elements stored in each sub-table. Elements of each sub-table that can be easily generated from other elements of the sub-table through multiplication and subtraction are omitted from storage. These elements can be generated on-the-fly by performing fast ECC addition, negation, and doubling operations. This technique thus decreases the size of the acceleration table, thereby decreasing the likelihood of frequent swapping into cache, which can improve performance. Furthermore, the reduced table size can be beneficial in contexts having limited storage space, such as in embedded devices.

One embodiment is directed to a method. The method includes (A) receiving, from a user interface, an input value to be cryptographically processed, (B) applying, in a microprocessor, ECC based cryptographic processing to the input value to generate a cryptographically processed value, and (C) outputting the generated cryptographically processed value via the user interface. Applying ECC based cryptographic processing to the input value to generate the cryptographically processed value includes (a) performing ECC scalar multiplication to calculate an ECC scalar multiplication result with an enhanced acceleration table (EAT), the EAT including a plurality of ordered sub-tables, each sub-table including a plurality of entries, and (b) cryptographically processing the received input value according to an ECC based cryptographic processing algorithm using the calculated ECC scalar multiplication result to generate the cryptographically processed value. Calculating the ECC scalar multiplication result with the EAT includes (a) generating a plurality of running totals, each running total being associated with a positive integer multiplier, and (b) calculating the sum of each running total multiplied by its associated positive integer multiplier, this sum being the ECC scalar multiplication result. Generating the plurality of running totals includes, for each sub-table of the plurality of sub-tables, (a) adding a first value associated with an entry in that sub-table to a running total of the plurality of running totals, and (b) carrying a second value to a next sub-table, except for the last sub-table of the plurality of ordered sub-tables. For one sub-table of the plurality of sub-tables, the running total is associated with a multiplier greater than 2.

Another embodiment is directed to a computer program product for performing a similar method. Another embodiment is directed to an integrated circuit chip for performing a similar method, the integrated circuit chip further having a high speed on-board cache, the cache being constructed and arranged to store the entire contents of the EAT and instructions to be performed.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

I. Introduction

Figure 1:
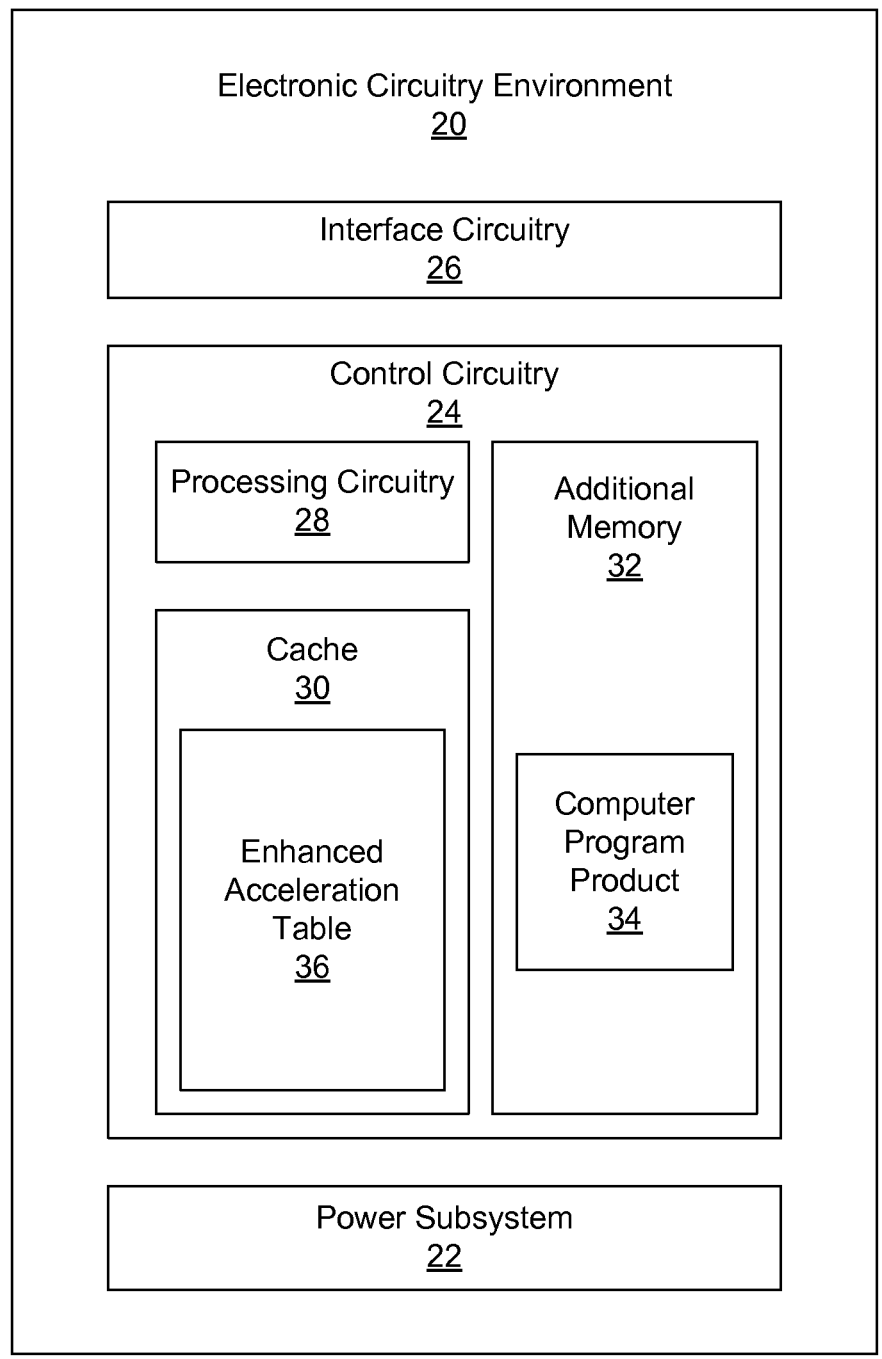
FIG. 1 illustrates an apparatus of one embodiment.

Elliptic Curve Cryptography (ECC) Scalar Multiplication is the multiplication of a point on a curve by a scalar. ECC scalar multiplication can be accelerated by pre-generating multiples of the point to be multiplied. This set of pre-generated values is called an acceleration table. Acceleration tables are made up of sub-tables, each sub-table being used to calculate a partial result for a sub-set window size bits in length of the scalar.

Traditionally, the partial results have been calculated by adding points from the table or subtracting points from the table and carrying one to the next sub-set of the scalar. This is equivalent to for each sub-table adding to a reference value of 0 or subtracting from a reference value of $2^{window\ size}$.

Embodiments are directed to a method of using reference values other than 0 and $2^{window\ size}$; for instance, values $-1 \times (2^{window\ size})$ or $2 \times (2^{window\ size})$. These methods can result in acceleration tables that are smaller and more efficient than those currently in use.

ECC is based on a group of points on an elliptic curve defined over a finite field. An elliptic curve is a plane curve of the form:

$$y^2 = x^3 + ax + b \quad \text{(Eq. 1)}$$

The performance of ECC depends on the speed of finite field operations and scalar multiplication, the choice of curve and finite field.

While there is a standard type of elliptic curve equation, there are many different elliptic curves. They are distinguished by the values of their coefficients (a and b) and the finite field over which they are defined.

An elliptic curve group is defined by an operation that can be applied to points on an elliptic curve, referred to as point addition, together with a set of points on the curve.

This set of points is defined such that, given a point on the elliptic curve (also called a base point, or a generator point, G), all points in the set can be obtained by successive application of the point addition operation to the base point. The elliptic curve group includes the point at infinity which is the additive identity of the group. The number of points in the elliptic curve group is called the order.

Curves in common use are standardized by organizations such as the National Institute of Standards and Technology (NIST) and the American National Standards Institute (ANSI). These standardized curves are given names and are referred to as named curves. Despite being called named curves, they actually define an elliptic curve group. A curve that is used as an example curve throughout this document is P256, which is defined in NIST's FIPS186-2. Other examples include B283, K283, B409, K409, P384, B571, K571, and P521.

The scalar multiplication operation involves the multiplication of a point on an elliptic curve by a scalar (an integer). While it can be described in terms of successively applying point addition, there are several techniques available that allow a scalar multiplication to be performed much more quickly. One class of these techniques involves the use of a table of pre-generated multiples of the point to be scalar multiplied, known as an acceleration table.

ECC Scalar multiplication is used by a number of ECC algorithms such as Elliptic Curve Diffie-Hellman (ECDH), Elliptic Curve Digital Signature Algorithm (ECDSA), Dual Elliptic Curve Deterministic Random Bit Generator (ECDRBG), Elliptic Curve Integrated Encryption Scheme (ECIES), and elliptic curve key generation.

An understanding of the relative speed of point arithmetic operations is important when considering algorithms to speed up ECC calculations. The table below shows the relative processing speed of point arithmetic operations for a P256 curve on a 3.3 GHz Intel Pentium computer using Java Development Kit 1.5 (JDK) as released by Sun Microsystems of Santa Clara, Calif. The relative processing speed is expected to be similar for other curves. The term Zero refers to the point at infinity (i.e. the additive identity).

TABLE 1

Operations per Second, P256 Curve, Pentium 3.3 GHz, Sun JDK 1.5

| Point Operation | Absolute Operations Per Second | Operations Per Second Relative to Add |
|---|---|---|
| Add | 6932 | 1 |
| Add to Zero | 714109 | 0.01 |
| Double | 8000 | 0.87 |
| Double Zero | 656043 | 0.01 |
| Negate | 345267 | 0.02 |

What table 1 shows is that adding a point to a point which is zero, doubling a point which is zero, and negating a point are all relatively inexpensive operations relative to doubling and adding non-zero points. Doubling a point, however, is still less expensive than adding two points.

Scalar multiplication can be accelerated by pre-generating multiples of the point to be multiplied. This set of pre-generated values is called an acceleration table and is most commonly generated for the base points and public points of named curves.

To multiply a point P by a scalar k, consider splitting the binary representation of k into w-bit parts, or windows. For every scalar k less than the order of the elliptic curve group, the required scalar multiple can be written as the following sum:

$$kP = a_s*(2^{w(s-1)})P + \ldots + a_3*(2^{2w})P + a_2*(2^w)P + a_1P \quad \text{(Eq. 2)}$$

In this equation, ws is the bit length of the order of the group, and each of $a_1, \ldots, a_s$ range from 0 up to $(2^w-1)$. The value w is referred to as the window size. The value s is the number of windows in the binary representation in k. The binary representation of k is commonly required to be the same as the order of the group. Each of $a_1, \ldots, a_s$ represent the value of a window of bits of the scalar k.

For example for a window size of 3 bits, the scalar 441 can be written:

$$441P = (2^6)*6P + (2^3)*7P + 1P \quad \text{(Eq. 3)}$$

$$441P = 384P + 56P + 1P \quad \text{(Eq. 4)}$$

The multiples 6P, 7P, 1P, can be determined from the windows of bits of the binary representation of 441 which is 110 111 001.

Suppose that all of the following multiples were pre-generated:

TABLE 2

| | | |
|---|---|---|
| $(2^6) * 1P$ | $(2^3) * 1P$ | 1P |
| $(2^6) * 2P$ | $(2^3) * 2P$ | 2P |
| $(2^6) * 3P$ | $(2^3) * 3P$ | 3P |
| $(2^6) * 4P$ | $(2^3) * 4P$ | 4P |
| $(2^6) * 5P$ | $(2^3) * 5P$ | 5P |
| $(2^6) * 6P$ | $(2^3) * 6P$ | 6P |
| $(2^6) * 7P$ | $(2^3) * 7P$ | 7P |

To compute the scalar multiple kP for any scalar k of 9 bits simply requires (at most) the addition of one pre-generated point from each column. Note that it is not necessary to store a row for 0P, since the result is always zero.

In general, for an elliptic curve group where the order of the group is ws bits for a window size of w, any scalar multiple kP can be computed with a maximum of (s−1) addition operations.

This table of pre-computed multiples of a point is called an acceleration table. Each column of pre-generated values is referred to as a sub-table.

The estimated time required to perform a scalar multiplication operation using an acceleration table is (approximately) calculated by determining the total number of Add and Double operations that must be performed on average and then converting the number of Double operations to equivalent Add operations by applying the experimentally determined factor of 0.87 (as introduced above; see table 1).

Calculating the performance of scalar multiplication in this way assumes idealized hardware with either no CPU data cache or a very large data cache with no cache-misses occurring during the scalar multiplication. Cache-misses are expensive on modern CPUs as CPU speed has been increasing more rapidly than memory speed. This has been alleviated to some extent by larger caches and multi-level caches.

In practice, the performance of accelerated scalar multiplication is reduced as the number of cache-misses incurred while referencing points in the acceleration table increases. Un-accelerated scalar multiplication, however, has a small memory access footprint and is not likely to incur many cache-misses, even if the data cache is quite small.

The probability of a cache-miss occurring depends on the proportion of the acceleration table that is resident in the cache. If the acceleration table is larger than the cache size then accessing points in the acceleration table tend to displace other parts of the acceleration table from the cache. Other code executed by the CPU between scalar multiplication operations may also perform memory accesses that tend to displace parts of the acceleration table from the cache; this includes calculation of accelerated scalar multiples of other points.

In actual use on real hardware, the performance of scalar multiplication using large acceleration tables tend to be lower than the theoretical values estimated in this document, especially when the CPU is doing work other than calculating scalar multiples of the same point, while small acceleration tables tend to more closely achieve their theoretical performance levels. For this reason, small acceleration tables should be favored over large ones when the large table would only provide a small theoretical advantage. Depending on the hardware and the acceleration table used, it is even possible for un-accelerated scalar multiplication to out-perform accelerated scalar multiplication, especially when other techniques not covered in this document are used to improve the un-accelerated scalar multiplication.

Common CPUs in use today include level 1 data caches of 32 to 64 kilobytes (KB) (per core) and level 2 caches of 256 to 512 KB (per core). Some modern CPUs also contain slower integrated shared level 3 caches of up to 12 megabytes. Since a point in P256 contains two 256-bit values, about 512 bits (or 64 bytes) is needed per point. Thus, acceleration tables having significantly fewer than 512 points are beneficial for CPUs having a 32 KB cache, while acceleration tables having fewer than 1,024 points are beneficial for CPUs having a 64 KB cache. Significantly fewer points may be needed because additional data beyond the acceleration table may need to be stored in the cache as well, as noted above. An additional slowdown may be experienced as the size of the acceleration table approaches 4,096 points for a CPU having a 256 KB level 2 cache or 8,192 points for a CPU having a 512 KB level 2 cache. Similarly, an additional slowdown may be experienced for even larger acceleration tables exceeding the size of the layer 3 cache (e.g., more than 196,608 points for a 12 megabyte layer 3 cache, although this is unlikely to pose a problem). In practice, using common CPUs with 32 KB caches, acceleration tables having more than about 500 points tend to be quite inefficient. However, generally speaking, the smaller the acceleration table the better, although this must be balanced against the number of additional operation required to be performed to compensate for the reduced table size.

By reducing the number of multiples stored in each sub-table, and slightly modifying the method of performing the scalar multiplication, the acceleration table size can be greatly reduced while still maintaining significantly improved performance over un-accelerated multiplications.

There are a number of techniques to reduce the size of each sub-table. These techniques can be combined to produce acceleration tables suited to particular computational environments.

The smaller the window size is, the smaller the size of the acceleration table. However, this of course also means that the number of additions to compute the scalar multiple kP will increase. Window size choice also therefore depends on the size of the elliptic curve group since the larger the order, the larger the number of sub-tables in the acceleration table.

In elliptic curve groups, the subtraction of a point from another point requires a point negation and a point addition. A point negation involves the subtraction of one ordinate from the modulus. This is significantly faster than a point addition. Therefore, since negation is so inexpensive, the subtract operation is approximately as computationally expensive as addition. This fact can be taken advantage of to reduce the size of an acceleration table significantly.

Again, consider the acceleration table with a window size of 3 presented above. Now consider the multiple 5P: it can be computed by subtracting 3P from 8P. The multiple 3P already exists in the table, and the multiple 8P also exists in the table (as $(2^3)$ *1P in the second sub-table). Consequently, the multiple 5P is not required to be stored in the table, but can be obtained by adding 8P and subtracting 3P. This is achieved by carrying a bit from the first window into the second window, and adding the negation of 3P to the total.

The multiples 6P and 7P can both be calculated in a similar way, and are therefore not required in the table. The exclusion of these multiples can be propagated across all sub-tables, yielding the reduced size acceleration table as follows:

TABLE 3

| $(2^9)$ * 1P | $(2^6)$ * 1P | $(2^3)$ * 1P | 1P |
|---|---|---|---|
| | $(2^6)$ * 2P | $(2^3)$ * 2P | 2P |
| | $(2^6)$ * 3P | $(2^3)$ * 3P | 3P |
| | $(2^6)$ * 4P | $(2^3)$ * 4P | 4P |

Note the additional multiple that must be added to the acceleration table to account for the possibility of a carry from the third window.

Using this acceleration table, to compute the scalar multiple kP for any scalar k of 9 bits requires at most the three additions and three negations.

In general, for an elliptic curve group where the order of the group is ws bits for a window size of w, for the sub-table corresponding to the least significant bits of the scalar, all multiples greater than $2^{w-1}$ are not required in the acceleration table. The corresponding multiples in all other sub-tables can also be excluded. Any scalar multiple kP can be computed with a maximum of s addition operations and s negations.

All sub-tables contain the same number of multiples (ignoring the extra multiple mentioned above) and each entry can be calculated by multiplying the corresponding entry in the previous sub-table by $2^w$. The set of multiples in the first sub-table are therefore an attribute of the entire acceleration table and the multiplication factors used in the first table are referred to as the indices of the table. The indices of the acceleration table above are 1, 2, 3 and 4.

II. Using Multiple Running Totals

Again, consider the acceleration table with a window size of 3. Many multiples can be obtained by doubling an existing multiple. For example, 4P=2*2P.

Consider the removal of this multiple, and the corresponding multiples in other sub-tables, from the acceleration table. When 4P is required to be added as part of a scalar multiplication, instead of adding it to the running total, 2P can be added to a second running total of "to be doubled" points. To complete the scalar multiplication, this second running total can be doubled and added to the first running total. The multiple 6P can also be removed from the acceleration table and accounted for by adding 3P to the second running total. The additional cost of including this second running total is only the double and add required to complete the multiplication.

This technique can be extended to include more than two running totals. For example, a running total to be tripled (using double and add operations) or a running total to be quadrupled (using two double operations) could also be used. As the number of running totals used increases, the number of points in the acceleration table decreases, but the number of operations required to combine the running totals to complete the scalar multiplication also increases.

An acceleration table using more than two running tables may be referred to as an enhanced acceleration table (EAT).

A first example acceleration table for the P256 curve (referred to as Crypto-C) includes a window size of five bits and indices 1, 3, 4, 5, 7, 9, 11, 12, 13, 15 and 16. Two running totals are used: RT1 and RT2 (to be doubled). Point subtraction is also used. Table 4 illustrates how each multiple of 1P up to 31P (that is, $2^w-1$) can be obtained:

TABLE 4

P256 Acceleration Table, Five Bit Windows Size, Multiples 1 and 2

| Multiple To Add | Method to Compute | Running total | Carry to next window |
|---|---|---|---|
| 1P | 1P | RT1 | 0 |
| 2P | 2 * P1 | RT2 | 0 |
| 3P | 3P | RT1 | 0 |
| 4P | 4P | RT1 | 0 |
| 5P | 5P | RT1 | 0 |
| 6P | 2 * 3P | RT2 | 0 |
| 7P | 7P | RT1 | 0 |
| 8P | 2 * 4P | RT2 | 0 |
| 9P | 9P | RT1 | 0 |
| 10P | 2 * 5P | RT2 | 0 |
| 11P | 11P | RT1 | 0 |
| 12P | 12P | RT1 | 0 |
| 13P | 13P | RT1 | 0 |
| 14P | 2 * 7P | RT2 | 0 |
| 15P | 15P | RT1 | 0 |
| 16P | 16P | RT1 | 0 |
| 17P | 32P – 15P | RT1 | 1 |
| 18P | 2 * 9P | RT2 | 0 |
| 19P | 32P – 13P | RT1 | 1 |
| 20P | 32P – 12P | RT1 | 1 |
| 21P | 32P – 11P | RT1 | 1 |
| 22P | 2 * 11P | RT2 | 0 |
| 23P | 32P – 9P | RT1 | 1 |
| 24P | 2 * 12P | RT2 | 0 |
| 25P | 32P – P7 | RT1 | 1 |
| 26P | 2 * 13P | RT2 | 0 |
| 27P | 32P – 5P | RT1 | 1 |
| 28P | 32P – 4P | RT1 | 1 |
| 29P | 32P – 3P | RT1 | 1 |

TABLE 4-continued

P256 Acceleration Table, Five Bit Windows Size, Multiples 1 and 2

| Multiple To Add | Method to Compute | Running total | Carry to next window |
|---|---|---|---|
| 30P | 2 * 15P | RT2 | 0 |
| 31P | 32P − 1P | RT1 | 1 |

A binary method for computing an elliptic curve scalar multiplication kP for a scalar k and a point P when there is no acceleration table is:

```
total=zero
for each bit of k {
   if (bit set) {
      total=total+P
   }
   P=double (P)
}
```

For each bit of the size of the group there is a double; there is also an add if the bit of the scalar is set. On average only half the bits of the scalar are set. Hence, for a P256 curve, on average there are 256 doubles and 128 adds.

Given that one double takes 0.87 as much time as an add, the speed of a scalar multiply on the P256 curve is equivalent to:

$$= 0.87 * 256 + 128 \text{ adds}$$
$$= 350.7 \text{ adds}.$$

When calculating the theoretical speed of an acceleration table the following points should be remembered:
  The point result from the first sub-table is added to zero. Adding to zero is an inexpensive operation when compared to adding two points. Hence, this can be ignored.
  If a window is zero then no calculation occurs.
  If a window is not zero then there is one add per sub-table.
  If subtracting from $2^w$ is used (i.e. subtracting from the "1P" entry in the next sub-table), then the probability that an add will be required for the final single-entry sub-table is the probability that subtraction will be used in a sub-table. This possible final add can be shown to be impossible if the table is designed such that given the scalars to be applied to the table, no subtractions can be required.
  If doubles are being used, there is one double for the entire scalar multiplication.
  If for all the sub-tables, none of the parts of the scalar applied to the sub-tables resulted in a point being added to the running total to be used for doubling, then the doubling operation would be doubling zero, which is an inexpensive operation.

Applying these points to the Crypto-C five bit table used for P256 with multipliers of 1 and 2:
  The field size of P256 is 256 bits. The window size is 5 bits. The number of sub-tables=256/5=51.2. Rounding this up gives 52.
  The window size is five bits, so the probability that a window is zero is 1/32. Hence the probability that it is not zero is 31/32≈0.97.
  Given that the add for the first sub-table is free, there are 52 sub-tables, and the probability for any sub-table executing an add is 0.97, the average number of adds, due to adding up each sub-table is (52−1)*0.97.
  Ten of the values are obtained using subtraction. Hence, the probability of needing to do a final add is 10/32≈0.31. However, for P256 the probability of having to add the "virtual" window value is zero, since only one bit of the last window is used. Even with a carry from the second last window, a subtraction will not be required in the last window.
  To combine the running totals requires doubling the second running total, and adding it to the first. That is, 1 double and 1 add is required.
The number of adds and doubles required is:

$$= 1 \text{ double} + 1 \text{ add} + (52 − 1) * 0.97 \text{ adds}$$
$$= 1 \text{ double} + 50.47 \text{ adds}.$$

Given that one double takes 0.87 as much time as an add, the speed of the algorithm associated with the Crypto-C table is equivalent to:

$$\text{speed}=0.87+50.47 \text{ adds}$$

$$\text{speed}=51.34 \text{ adds}.$$

The size of this acceleration table is given by:

$$\text{size}=11 \text{ points per sub-table} \times (\text{ceiling}(256/5) \text{ sub-tables})$$

$$\text{size}=11 \times 52 \text{ points}$$

$$\text{size}=572 \text{ points}$$

A second example is provided with respect to a 6 bit window size using multipliers of 1, 2, 3, and 4. Table 5 for the P256 curve uses an EAT with a window size of six bits and indices 1, 5, 7, 8, 9, 11, 13, 17, 19, 23 and 29. Subtracting from the 1P value of the next sub-table is used. That is using reference values 0 and 1. Given a six bit window size, in Table 5, $2^w$ equals 64P, which equals 1P from the next sub-table. Doubling, tripling, and quadrupling are used. That is multiplying the running totals by 1, 2, 3, and 4. The indices are used as shown in table 5.

TABLE 5

P256 Acceleration Table, Six Bit Windows Size, Multiples 1, 2, 3, and 4

| Value | Multiples of Point | Indices | Operation | Reference Value |
|---|---|---|---|---|
| 1 | P1 | 1 | Add | 0 |
| 2 | P1 × 2 | 1 | Add, Double | 0 |
| 3 | P1 × 3 | 1 | Add, Triple | 0 |
| 4 | P1 × 4 | 1 | Add, Quadruple | 0 |
| 5 | P5 | 5 | Add | 0 |
| 6 | P64 − P29 × 2 | 29 | Subtract, Double | 1 |
| 7 | P7 | 7 | Add | 0 |
| 8 | P8 | 8 | Add | 0 |
| 9 | P9 | 9 | Add | 0 |
| 10 | P5 × 2 | 5 | Add, Double | 0 |
| 11 | P11 | 11 | Add | 0 |
| 12 | P64 − P13 × 4 | 13 | Subtract, Quadruple | 1 |
| 13 | P13 | 13 | Add | 0 |
| 14 | P7 × 2 | 7 | Add, Double | 0 |
| 15 | P5 × 3 | 5 | Add, Triple | 0 |
| 16 | P8 × 2 | 8 | Add, Double | 0 |
| 17 | P17 | 17 | Add | 0 |
| 18 | P9 × 2 | 9 | Add, Double | 0 |
| 19 | P19 | 19 | Add | 0 |
| 20 | P5 × 4 | 5 | Add, Quadruple | 0 |
| 21 | P7 × 3 | 7 | Add, Triple | 0 |
| 22 | P11 × 2 | 11 | Add, Double | 0 |

TABLE 5-continued

P256 Acceleration Table, Six Bit Windows Size, Multiples 1, 2, 3, and 4

| Value | Multiples of Point | Indices | Operation | Reference Value |
|---|---|---|---|---|
| 23 | P23 | 23 | Add | 0 |
| 24 | P8 × 3 | 8 | Add, Triple | 0 |
| 25 | P64 – P13 × 3 | 13 | Subtract, Triple | 1 |
| 26 | P13 × 2 | 13 | Add, Double | 0 |
| 27 | P9 × 3 | 9 | Add, Triple | 0 |
| 28 | P7 × 4 | 7 | Add, Quadruple | 0 |
| 29 | P29 | 29 | Add | 0 |
| 30 | P64 – P17 × 2 | 17 | Subtract, Double | 1 |
| 31 | P64 – P11 × 3 | 11 | Subtract, Triple | 1 |
| 32 | P8 × 4 | 8 | Add, Quadruple | 0 |
| 33 | P11 × 3 | 11 | Add, Triple | 0 |
| 34 | P17 × 2 | 17 | Add, Double | 0 |
| 35 | P64 – P29 | 29 | Subtract | 1 |
| 36 | P9 × 4 | 9 | Add, Quadruple | 0 |
| 37 | P64 – P9 × 3 | 9 | Subtract, Triple | 1 |
| 38 | P19 × 2 | 19 | Add, Double | 0 |
| 39 | P13 × 3 | 13 | Add, Triple | 0 |
| 40 | P64 – P8 × 3 | 8 | Subtract, Triple | 1 |
| 41 | P64 – P23 | 23 | Subtract | 1 |
| 42 | P64 – P11 × 2 | 11 | Subtract, Double | 1 |
| 43 | P64 – P7 × 3 | 7 | Subtract, Triple | 1 |
| 44 | P11 × 4 | 11 | Add, Quadruple | 0 |
| 45 | P64 – P19 | 19 | Subtract | 1 |
| 46 | P64 – P9 × 2 | 9 | Subtract, Double | 1 |
| 47 | P64 – P17 | 17 | Subtract | 1 |
| 48 | P64 – P8 × 2 | 8 | Subtract, Double | 1 |
| 49 | P64 – P5 × 3 | 5 | Subtract, Triple | 1 |
| 50 | P64 – P7 × 2 | 7 | Subtract, Double | 1 |
| 51 | P64 – P13 | 13 | Subtract | 1 |
| 52 | P13 × 4 | 13 | Add, Quadruple | 0 |
| 53 | P64 – P11 | 11 | Subtract | 1 |
| 54 | P64 – P5 × 2 | 5 | Subtract, Double | 1 |
| 55 | P64 – P9 | 9 | Subtract | 1 |
| 56 | P64 – P8 | 8 | Subtract | 1 |
| 57 | P64 – P7 | 7 | Subtract | 1 |
| 58 | P29 × 2 | 29 | Double | 0 |
| 59 | P64 – P5 | 5 | Subtract | 1 |
| 60 | P64 – P1 × 4 | 1 | Subtract, Quadruple | 1 |
| 61 | P64 – P1 × 3 | 1 | Subtract, Triple | 1 |
| 62 | P64 – P1 × 2 | 1 | Subtract, Double | 1 |
| 63 | P64 – P1 | 1 | Subtract | 1 |

The calculation of the speed of multiplication for table 5 for a second example P256 curve is shown below:

The field size of P256 is 256 bits. The window size is 6 bits. The number of sub-tables=$256/6 \approx 42.7$. Rounding this value up gives 43.

The window size is six bits, so the probability that the part of the scalar applied to the sub-table is zero is 1/64. Hence the probability that it is not zero is $63/64 \approx 0.984$.

Given that the add for the first sub-table for each running total is free, there are 43 sub-tables, there are four running totals, and the probability for any sub-table executing an add is 0.984, the average number of adds due to adding up each sub-table is $(43-4)*0.984$.

For P256, the number of bits applied to the last window is 4 (256–(window size of 6)*42 sub-tables=4 bits). In the range of scalar values, 0 to 15, the number of values which are obtained using an operation which requires a carry (subtraction or addition of –P64) is 2. Hence the probability of needing to do a final add of the carry bit is $2/16=0.125$.

Eighteen of the values are obtained by adding them to the running total for doubling, and then doubling that running total. The probability that at least one of the sub-tables uses a value which requires doubling is given by: $1-(1-18/64)^{43} \approx 0.99999 \approx 1$. Hence, it is almost 100% likely that a double will be required.

Fourteen of the values are obtained by adding them to the running total for tripling, and then tripling that running total. The probability that at least one of the sub-tables uses a value which requires tripling is given by: $1-(1-14/64)^{43} \approx 0.99998 \approx 1$. Hence, it is almost 100% likely that a triple will be required.

Nine of the values are obtained by adding them to the running total for quadrupling, and then quadrupling that running total. The probability that at least one of the sub-tables uses a value which requires quadrupling is given by: $1-(1-9/64)^{43} 26\ 0.998521=1$. Hence, it is almost 100% likely that a quadruple will be required.

Note that if a double, triple and quadruple are done, then the running totals are combined using the method shown below. This result in only four Adds and two Doubles.

Define:

RT1=Running total of values not to be doubled, tripled or quadrupled

RT2=Running total of values to be doubled

RT3=Running total of values to be tripled

RT4=Running total of values to be quadrupled

Total=combined total of all running totals.

Total=Add(RT1, Add(RT3, Double(Add(RT3, Add(RT2, Double(RT4))))))

The number of adds and doubles required is:

$$= (\text{add values from sub-tables}) + (\text{final virtual sub-table}) + (\text{combine running totals})$$
$$= ((43-4)*0.984 \text{ adds}) + (0.125 \text{ adds}) + 2 \text{ doubles} + 4 \text{ adds}$$
$$= 2 \text{ doubles} + 42.45 \text{ adds}$$

Given that one double takes 0.87 as much time as an add, the speed of the algorithm associated with the EAT of table 5 is equivalent to:

$$\text{speed} = 0.87*2 + 42.45 \text{ adds}$$
$$= 44.19 \text{ adds}.$$

The size of this EAT is given by:

$$\text{size} = 11 \text{ points per sub-table} \times (\text{ceiling}(256/6)\text{sub-tables}) + \text{one point for virtual table}$$
$$= 11 \times 43 + 1 \text{ points}$$
$$= 474 \text{ points}$$

For P256, the size of each point is 2×256/8=64 bytes. Hence, the size of this acceleration table is 64×474=30,336 bytes, which may just barely fit within a 32 KB cache.

III. Reference Values Other than 0 and $2^{window\ size}$

Previously, all subtractions were relative to $2^w$, resulting in a carry of 1 to the next window. In one embodiment, a new way of using acceleration tables is to use reference values other than 0 and $2^w$: for instance additions relative to $-(2^w)$ and subtractions relative to $2\times(2^w)$. Note that these new reference values are multiples of $2^w$ which map to carrying integer values to the next window. Thus, for additions relative to $-(2^w)$, a carry of $-1$ is performed, while for subtractions relative to $2\times(2^w)$, a carry of 2 is performed.

The reference values which can be productively used depend on the multiples that are to be used with a sub-table. The largest positive and negative reference values are given by:

Largest negative ref value=−(maximum multiplier−1)×$2^w$

Largest positive ref value=maximum multiplier×$2^w$ where maximum multiplier is the maximum multiple to be used with the sub-table.

The values to be carried to the part of the scalar to be applied to the next sub-table range from:

−(maximum multiplier−1)

to:

maximum multiplier

This implies that the final sub-table will need to be able to handle values in this range, which includes negative scalar values.

An acceleration table for use with reference values other than 0 and $2^w$ may also be referred to as an enhanced acceleration table (EAT). This technique is of value because it allows the size of the EAT to be further reduced.

A third example is provided with respect to a 6 bit window size using multipliers of 1, 2, 3, and 4 as well as reference values other than 0 and $2^w$. The table below for the P256 curve uses an acceleration table with a window size of six bits and indices 1, 5, 7, 8, 9, 11, 13, 17, 19 and 29. Subtracting from the 1P and 2P values and adding to the −1P values of the next sub-table are used. That is, using reference values −1, 0, 1, and 2. Given a six bit window size, in the figure below $2^w$ equals 64P, which equals 1P from the next sub-table. Doubling, tripling, and quadrupling are used. That is, multiplying the running totals by 1, 2, 3, and 4. The indices are used as shown in table 6.

TABLE 6

P256 Acceleration Table, Six Bit Windows Size, Multiples 1, 2, 3, and 4 and other reference values

| Values | Multiples of Point | Indices | Operation | Reference Value |
|---|---|---|---|---|
| 1 | P1 | 1 | Add | 0 |
| 2 | P1 × 2 | 1 | Add, Double | 0 |
| 3 | P1 × 3 | 1 | Add, Triple | 0 |
| 4 | P1 × 4 | 1 | Add, Quadruple | 0 |
| 5 | P5 | 5 | Add | 0 |
| 6 | P64 − P29 × 2 | 29 | Subtract, Double | 1 |
| 7 | P7 | 7 | Add | 0 |
| 8 | P8 | 8 | Add | 0 |
| 9 | P9 | 9 | Add | 0 |
| 10 | P5 × 2 | 5 | Add, Double | 0 |
| 11 | P11 | 11 | Add | 0 |
| 12 | P64 − P13 × 4 | 13 | Subtract, Quadruple | 1 |
| 13 | P13 | 13 | Add | 0 |
| 14 | P7 × 2 | 7 | Add, Double | 0 |
| 15 | P5 × 3 | 5 | Add, Triple | 0 |
| 16 | P8 × 2 | 8 | Add, Double | 0 |
| 17 | P17 | 17 | Add | 0 |
| 18 | P9 × 2 | 9 | Add, Double | 0 |
| 19 | P19 | 19 | Add | 0 |
| 20 | P5 × 4 | 5 | Add, Quadruple | 0 |
| 21 | P7 × 3 | 7 | Add, Triple | 0 |
| 22 | P11 × 2 | 11 | Add, Double | 0 |
| 23 | −P64 + P29 × 3 | 29 | Add, Triple | −1 |
| 24 | P8 × 3 | 8 | Add, Triple | 0 |
| 25 | P64 − P13 × 3 | 13 | Subtract, Triple | 1 |
| 26 | P13 × 2 | 13 | Add, Double | 0 |
| 27 | P9 × 3 | 9 | Add, Triple | 0 |
| 28 | P7 × 4 | 7 | Add, Quadruple | 0 |
| 29 | P29 | 29 | Add | 0 |
| 30 | P64 − P17 × 2 | 17 | Subtract, Double | 1 |
| 31 | P64 − P11 × 3 | 11 | Subtract, Triple | 1 |
| 32 | P8 × 4 | 8 | Add, Quadruple | 0 |
| 33 | P11 × 3 | 11 | Add, Triple | 0 |
| 34 | P17 × 2 | 17 | Add, Double | 0 |
| 35 | P64 − P29 | 29 | Subtract | 1 |
| 36 | P9 × 4 | 9 | Add, Quadruple | 0 |
| 37 | P64 − P9 × 3 | 9 | Subtract, Triple | 1 |
| 38 | P19 × 2 | 19 | Add, Double | 0 |
| 39 | P13 × 3 | 13 | Add, Triple | 0 |
| 40 | P64 − P8 × 3 | 8 | Subtract, Triple | 1 |
| 41 | 2 × P64 − P29 × 3 | 29 | Subtract, Triple | 2 |
| 42 | P64 − P11 × 2 | 11 | Subtract, Double | 1 |
| 43 | P64 − P7 × 3 | 7 | Subtract, Triple | 1 |
| 44 | P11 × 4 | 11 | Add, Quadruple | 0 |
| 45 | P64 − P19 | 19 | Subtract | 1 |
| 46 | P64 − P9 × 2 | 9 | Subtract, Double | 1 |
| 47 | P64 − P17 | 17 | Subtract | 1 |
| 48 | P64 − P8 × 2 | 8 | Subtract, Double | 1 |
| 49 | P64 − P5 × 3 | 5 | Subtract, Triple | 1 |
| 50 | P64 − P7 × 2 | 7 | Subtract, Double | 1 |
| 51 | P64 − P13 | 13 | Subtract | 1 |
| 52 | P13 × 4 | 13 | Add, Quadruple | 0 |
| 53 | P64 − P11 | 11 | Subtract | 1 |
| 54 | P64 − P5 × 2 | 5 | Subtract, Double | 1 |
| 55 | P64 − P9 | 9 | Subtract | 1 |
| 56 | P64 − P8 | 8 | Subtract | 1 |
| 57 | P64 − P7 | 7 | Subtract | 1 |
| 58 | P29 × 2 | 29 | Double | 0 |
| 59 | P64 − P5 | 5 | Subtract | 1 |
| 60 | P64 − P1 × 4 | 1 | Subtract, Quadruple | 1 |
| 61 | P64 − P1 × 3 | 1 | Subtract, Triple | 1 |
| 62 | P64 − P1 × 2 | 1 | Subtract, Double | 1 |
| 63 | P64 − P1 | 1 | Subtract | 1 |

The calculation of the speed of multiplication for the algorithm associate with table 6 for a P256 curve is shown below:

The field size of P256 is 256 bits. The window size is 6 bits.

The number of sub-tables =256/6≈42.7. Rounding this value up gives 43.

The window size is six bits, so the probability that the part of the scalar applied to the sub-table is zero is 1/64. Hence the probability that it is not zero is 63/64≈0.984.

Given the add for the first sub-table for each running total is free, there are 43 sub-tables, there are four running totals, and the probability for any sub-table executing an add is 0.984, the average number of adds, due to adding up each sub-table is (43−4)*0.984.

For P256, the number of bits applied to the last window is 4 (256−(window size of 6)*42 sub-tables=4 bits). In the range of scalar values, 0 to 15, the number of values which are obtained using an operation which requires a carry (subtraction or addition of −P64) is 2. Hence the probability of needing to do a final add of the carry bit is 2/16=0.125.

Eighteen of the values are obtained by adding them to the running total for doubling, and then doubling that running total. The probability that at least one of the sub-tables uses a value which requires doubling is given by: 1−(1−18/64)$^{43}$≈0.99999≈1. Hence, it is almost 100% likely that a double will be required.

Sixteen of the values are obtained by adding them to the running total for tripling, and then tripling that running total. The probability that at least one of the sub-tables uses a value which requires tripling is given by: 1−(1−16/64)$^{43}$≈0.99999≈1. Hence, it is almost 100% likely that a triple will be required.

Nine of the values are obtained by adding them to the running total for quadrupling, and then quadrupling that running total. The probability that at least one of the sub-tables uses a value which requires quadrupling is given by: $1-(1-9/64)^{43} \approx 0.998521 \approx 1$. Hence, it is almost 100% likely that a quadruple will be required.

Note that if a double, triple, and quadruple are done, then the running totals are combined using the method shown below. This result in only four adds and two doubles. Define:
RT1=Running total of values not to be doubled, tripled, or quadrupled
RT2=Running total of values to be doubled
RT3=Running total of values to be tripled
RT4=Running total of values to be quadrupled
Total=combined total of all running totals.
Total=Add(RT1, Add(RT3, Double(Add(RT3, Add(RT2, Double(RT4))))))

The number of adds and doubles required is:

(add values from sub-tables) + (final virtual sub-table) + (combine running totals)
= ((43∗4)∗0.984 adds) + (0.125 adds) + 2 doubles + 4 adds
= 2 doubles + 42.45 adds Given that one double takes 0.87 as much time as an add, the speed of the algorithm associated with table 6 is equivalent to:

speed = 0.87 ∗ 2 + 42.45 adds
= 44.49 adds.

The size of this EAT is given by:

size = 10 points per sub-table × (ceiling(256/6)sub-tables) + one point for virtual table
= 10 × 43 + 1 points
= 431 points For P256, the size of each point is 2×256/8=64 bytes. Hence, the size of this acceleration table is 64×431=27,584 bytes. This is about 91% the size of the table from the second example, which is comparable except for the lack of reference values aside from 0 and 1. That is a 10% reduction in size, which is significant enough to increase the chances that the entire EAT will fit in a 32 KB level 1 cache.

As an example, the use of the above acceleration table to assist the scalar multiplication for 990,553,478×P is now shown. 990,553,478 written in binary (as a 256 bit representation with its digits grouped in sixes to accommodate the 6 bit window size) is 111011 000010 101010 010110 000110 (the additional 226 leading zeros are omitted for clarity).

Starting from the right, 000110 in binary indicates 6 in base 10. P6=P64−P29×2. So, 1 is carried to the next sub-table and index 29 of the first sub-table is negated and stored in RT2.

Moving on to the next sub-table, 010110 in binary indicates 22 in base 10. However, there is a carry of 1, so we must consider the value 23. P23=−P64+P29×3. So, −1 is carried to the next sub-table and index 29 of the second sub-table is added to RT3.

Moving on to the next sub-table, 101010 in binary indicates 42 in base 10. However, there is a carry of −1, so we must consider the value 41. P41=2×P64−P29×3. So, 2 is carried to the next sub-table and index 29 of the third sub-table is negated and added to RT3.

Moving on to the next sub-table, 000010 in binary indicates 2 in base 10. However, there is a carry of 2, so we must consider the value 4. P4=P1×4. So, there is no carry and index 1 of the fourth sub-table is added to RT4.

Moving on to the next sub-table, 111011 in binary indicates 59 in base 10. P59=P64−P5×1. So, there is a carry of 1 and index 5 of the fifth sub-table is negated and added to RT1.

Moving on to the next sub-table, 000000 in binary indicates 0 in base 10, but there is a carry of 1, so we must consider the value 1. P1=P1, so there is no carry and index 1 of the sixth sub-table is added to RT1.

The total sum of $RT1=(-5)(2^{24} \times P)+(1)(2^{30} \times P)$.

The total sum of $RT2=(-29)(2^0 \times P)$.

The total sum of $RT3=(29)(2^6 \times P)+(-29)(2^{12} \times P)$.

The total sum of $RT4=(1)(2^{18} \times P)$.

Accordingly, the scalar multiplication result is obtained by accumulating the running totals as follows: Result=RT1+RT3+2 (RT3+RT2+2×RT4).

IV. Electronic Circuit Environment

FIG. 1 shows an electronic circuitry environment 20 for practicing the various techniques described herein. Examples of such an environment 20 include embedded systems or devices, general purpose computers, and specialized or custom circuits, among others.

As shown in FIG. 1, the electronic circuitry environment 20 includes a power subsystem 22, control circuitry 24, and interface circuitry 26. The power subsystem 22 supplies power to the environment 20 (e.g., grid power, battery power, solar power, combinations thereof, etc.). The control circuitry 24 carries out significant operations relating to the techniques. The interface circuitry 26 enables information to be communicated electronically to and from the environment 20 (e.g., signal lines, optical interfaces, pads/pins to an IC device, electronic displays/buttons, etc.). Interface circuitry 26 may include a user interface, such as a keyboard, mouse display, keypad, combinations thereof, etc.

The control circuitry 24 includes processing circuitry 28 (e.g., one or more microprocessors, FPGAs, ASICs, dedicated circuitry, etc.), a high speed cache 30 (e.g., a level 1 or level 2 cache, quickly accessible semiconductor memory, etc.), and additional memory 32 (e.g., slower or more distant semiconductor memory, flash memory, magnetic memory, magnetic storage, etc.).

In some arrangements, the processing circuitry 28 resides in the core of a microprocessor device, and the high speed cache 30 resides in the cache of the microprocessor device. In such arrangements, software constructs (e.g., instructions, data structures, etc.) are frequently moved from the additional memory 32 into the cache 30 for quick access. In some embodiments, additional memory 32 stores a computer program product 34. In some embodiments, computer program product is a computer readable storage medium (such as a disk or memory) storing instructions to be performed by the processing circuitry 28. In some embodiments, cache 30 stores an enhanced acceleration table (EAT) 34 for use in performing ECC scalar multiplication. In some embodiments, cache 30 stores the entirety of EAT 34, while in other embodiments, cache 30 may only store a portion of EAT 34, the remainder being stored in additional memory 32.

In some embodiments, electronic circuitry environment 20 may be a computer. In other embodiments, electronic circuitry environment 20 may be a portable token for generating a one-time password. In other embodiments, electronic circuitry environment 20 may be an embedded device.

V. Method

Figure 2:
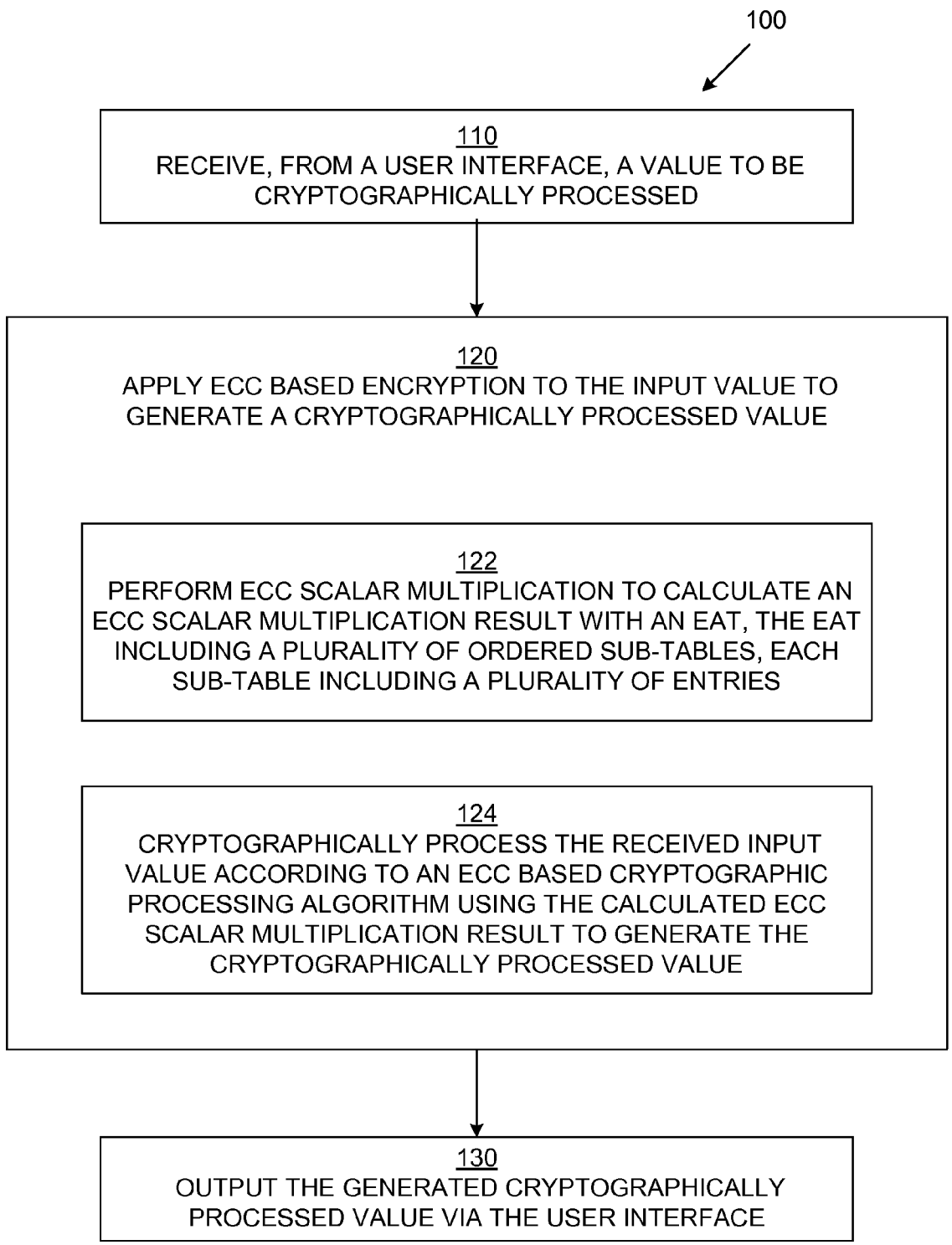
FIG. 2 illustrates a method of one embodiment.

FIG. 2 depicts a method 100 of one embodiment. The method is performed within the electronic circuitry environment 20. In step 110, control circuitry 24 receives, from user interface 26 a value to be cryptographically processed.

In step 120, control circuitry 24 applies ECC based cryptographic processing to the input value to generate a cryptographically processed value. Step 120 is made up of two sub-steps, including sub-steps 122 and 124. In sub-step 122, control circuitry 24 performs ECC scalar multiplication to calculate an ECC scalar multiplication result (or an ECC scalar product) by using an EAT 36. The EAT 36 includes a plurality of ordered sub-tables, and each sub-table includes a plurality of entries. Thus, for example, looking back at the third example from above (see Table 6 and surrounding text), each sub-table includes 10 entries, the entries storing $1(2^{wi})$, $5(2^{wi})$, $7(2^{wi})$, $8(2^{wi})$, $9(2^{wi})$, $11(2^{wi})$, $13(2^{wi})$, $17(2^{wi})$, $19(2^{wi})$, and $29(2^{wi})$ for sub-table number i (i ranging from 0 to s−1). In one embodiment, the EAT 36 is stored completely within cache 30. Thus, EAT 36 may be structured as in table 7 below:

TABLE 7

EAT for P256 Acceleration Table, Six Bit Windows Size, Multiples 1, 2, 3, and 4 and other reference values

| $(2^{258})$ * 1P | $(2^{252})$ * 1P | ... | $(2^6)$ * 1P | 1P |
|---|---|---|---|---|
| | $(2^{252})$ * 5P | | $(2^6)$ * 5P | 5P |
| | $(2^{252})$ * 7P | | $(2^6)$ * 7P | 7P |
| | $(2^{252})$ * 8P | | $(2^6)$ * 8P | 8P |
| | $(2^{252})$ * 9P | | $(2^6)$ * 9P | 9P |
| | $(2^{252})$ * 11P | | $(2^6)$ * 11P | 11P |
| | $(2^{252})$ * 13P | | $(2^6)$ * 13P | 13P |
| | $(2^{252})$ * 17P | | $(2^6)$ * 17P | 17P |
| | $(2^{252})$ * 19P | | $(2^6)$ * 19P | 19P |
| | $(2^{252})$ * 29P | | $(2^6)$ * 29P | 29P |

Figure 3:
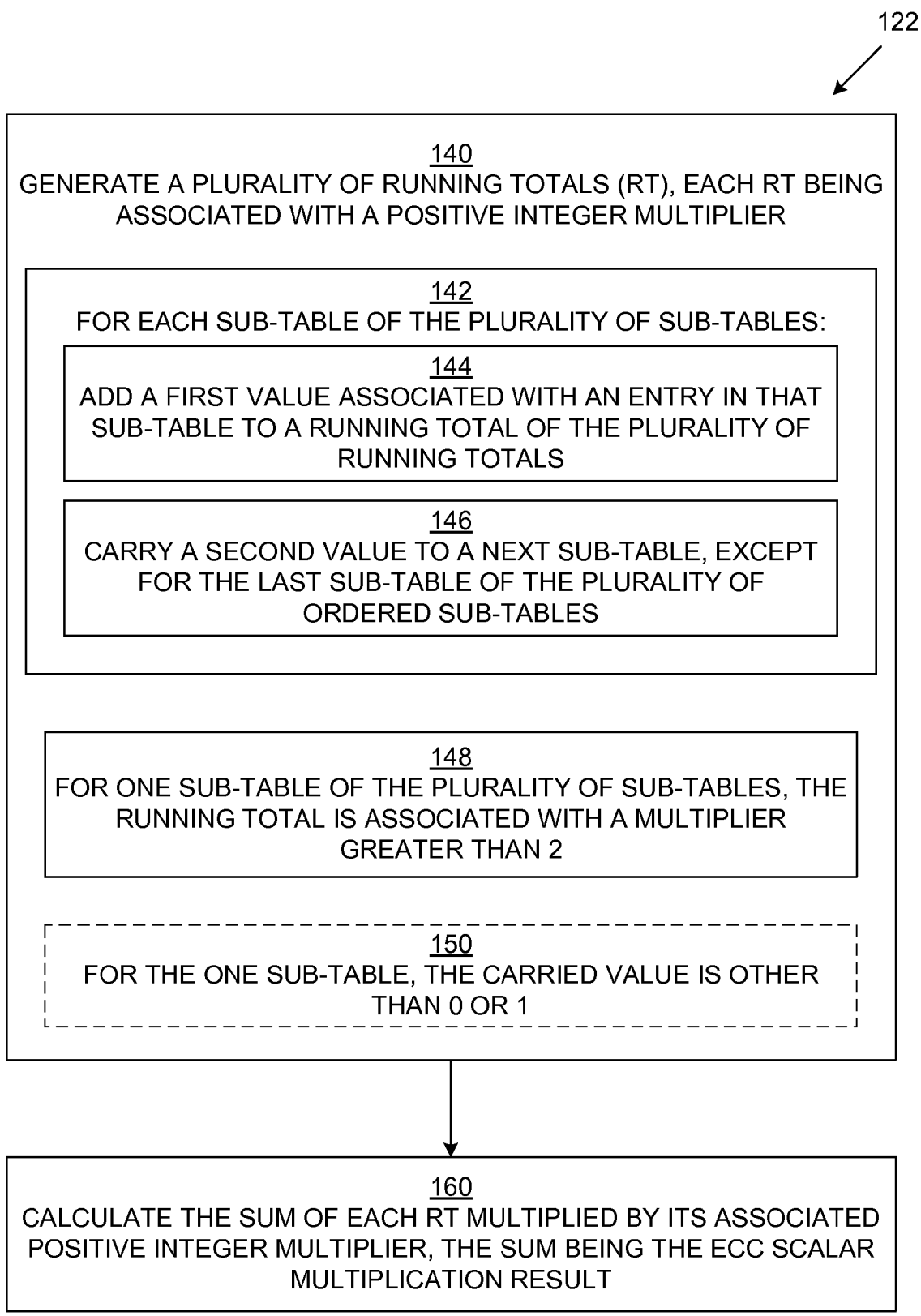
FIG. 3 illustrates a method of one embodiment.

The method of step 122 is shown in detail in FIG. 3. In step 140, control circuitry 24 generates a plurality of running totals, each running total being associated with a positive integer multiplier. For example, RT1 is associated with a multiplier of 1, RT2 is associated with a multiplier of 2, RT3 is associated with a multiplier of 3, and RT4 is associated with a multiplier of 4. Within step 140, for each sub-table (sub-step 142), control circuitry 24 adds a first value associated with a particular entry in that sub-table to one of the running totals (sub-sub-step 144). For example, in the third example, reference is made to Table 6, and the appropriate equation is chosen based on the binary value of the i-th window (for the i-th sub-table). For example, if the value is 47, the equation is P64−P17, so the $8^{th}$ value stored in the sub-table (i.e., $17(2^w)$) is negated (since P17 is subtracted) and added to RT1 (since P17 is not multiplied by a multiplier greater than 1). As another example, if the value is 23, the equation is −P64+P29×3, so the $10^{th}$ value stored in the sub-table (i.e., $29(2^w)$) is added to RT3 (since P29 is multiplied by 3) without any negation (since P29×3 is added). Then, in sub-sub-step 146, a value is carried to the next sub-table, if necessary. Thus, for 47, 1 is carried to the next sub-table, since P17 is subtracted from P64. On the other hand, for a value of 41, 2 is carried, for a value of 23, −1 is carried, and for a value of 8, 0 is carried (which may also be thought of as no carry at all).

Also within step 140, it should be noted that for at least one sub-table a value is added to one of the running totals other than RT1 or RT2 (sub-step 148), distinguishing from a conventional method of performing accelerated ECC scalar multiplication using only 2 running totals. In one embodiment (depicted in optional sub-step 150), the carry is a number other than 0 or 1 for at least one sub-table (to distinguish between the second and third examples above, associated with tables 5 and 6, respectively).

Within method 122, sub-step 160 is performed after step 140. Control circuitry 24 calculates the sum of each running total multiplied by its associated positive integer multiplier, the sum of these products being the ECC scalar multiplication result. Thus, for example, for 4 running totals, the equation Result=RT1+RT3+2 (RT3+RT2+2×RT4) might be used.

Returning back to FIG. 2, within step 120, sub-step 124 is also performed. In sub-step 124, control circuitry 24 cryptographically processes the received input value according to an ECC based cryptographic processing algorithm using the calculated ECC scalar multiplication result to generate the cryptographically processed value. This is done according to techniques well understood in the art, and therefore not repeated here.

Finally, in step 130, interface circuitry 26 outputs the cryptographically processed value over a user interface.

VI. Conclusion

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

While various embodiments of the invention have been particularly shown and described, it will be understood by those skilled in the art that various changes in form and details may be made therein without departing from the spirit and scope of the invention as defined by the appended claims, and are intended to belong to certain embodiments.

For example, while the dynamic generation of at least a portion of an acceleration table for use in elliptic curve cryptography has been described as being used in conjunction with creating and using public or private keys, it is not limited to this use and may be used in any situation where ECC is performed such as, for example, asymmetric encryption, key agreement, pseudo random number generation, or digital signatures.

For example, while the speed of scalar double operation has been described as requiring 0.87 as many operations as a scalar addition operation, in some embodiments of some systems, this relative speed may vary. Thus, in one system according to one embodiment, the speed of scalar double operation uses only 0.73 as many operations as a scalar addition operation

What is claimed is:

1. A method comprising:
(A) receiving, from a user interface, an input value to be cryptographically processed;
(B) applying, in a microprocessor, elliptic curve cryptography (ECC) based cryptographic processing to the input value to generate a cryptographically processed value, wherein:
(i) applying ECC-based cryptographic processing includes:
(a) performing ECC scalar multiplication to calculate an ECC scalar multiplication result with an enhanced acceleration table (EAT), the EAT including a plurality of ordered sub-tables, each sub-table including a plurality of entries; and
(b) cryptographically processing the received input value according to an ECC based cryptographic processing algorithm using the calculated ECC scalar multiplication result to generate the cryptographically processed value;
(ii) calculating the ECC scalar multiplication result with the EAT includes:
(a) generating a plurality of running totals, each running total being associated with a positive integer multiplier; and
(b) calculating the sum of each running total multiplied by its associated positive integer multiplier, this sum being the ECC scalar multiplication result;
(iii) generating the plurality of running totals includes, for each sub-table of the plurality of sub-tables:
(a) adding a first value associated with an entry in that sub-table to a running total of the plurality of running totals; and
(b) carrying a second value to a next sub-table, except for the last sub-table of the plurality of ordered sub-tables; and
(iv) for one sub-table of the plurality of sub-tables, the running total is associated with a multiplier greater than 2; and
(C) outputting the generated cryptographically processed value via the user interface.

2. A method as in claim 1 wherein, for the one sub-table, carrying the second value to the next sub-table includes carrying an integer value other than 0 or 1 to the next sub-table.

3. A method as in claim 2 wherein:
the first value associated with the entry in the one sub-table is a value stored in that entry; and
the second value carried to the next sub-table is a negative integer.

4. A method as in claim 2 wherein:
the first value associated with the entry in the one sub-table is a negation of a value stored in that entry; and
the second value carried to the next sub-table is a positive integer greater than 1.

5. A method as in claim 2 wherein:
performing ECC scalar multiplication includes calculating a product of a scalar value and a given point on an elliptic curve, the given point being represented by an ordered pair of coordinate values, a bit-length of each coordinate value of the ordered pair being equal to a field size of an elliptic curve group based on the given point and the elliptic curve, wherein the scalar value also has the same bit-length;
the number of sub-tables in the EAT is defined by the bit-length divided by a window-size;
a binary representation of the scalar value is divided into an ordered set of subsets, each subset being a binary value having a length equal to the window-size, each subset corresponding to a particular sub-table in order; and
generating the plurality of running totals further includes selecting an entry in that sub-table associated with the binary value of the subset associated with that sub-table.

6. A method as in claim 5 wherein:
the field size is 256;
the elliptic curve group is the NIST standard P256 elliptic curve group; and
the window-size is a fourth value chosen from the set {3, 4, 5, 6, 7, 8, 9, 10, 11, 12}.

7. A method as in claim 6 wherein
the window-size is 6;
for a first sub-table of the plurality of sub-tables having a corresponding subset having a binary value equal to 23:
selecting the entry in that sub-table associated with the binary value of the subset associated with that sub-table includes selecting the tenth entry of that sub-table; and
adding the first value associated with the entry in that sub-table to the running total of the plurality of running totals includes:
adding the value stored in the selected entry of that sub-table to a running total associated with the value 3; and
carrying a value of −1 to the next sub-table; and
for the next sub-table, subtracting one from the binary value of the subset that corresponds to that next sub-table prior to selecting the entry in that next sub-table associated with the binary value of the subset associated with that next sub-table.

8. A method as in claim 2 wherein calculating the sum of each running total multiplied by its associated positive integer multiplier consists of performing a series of nested addition, negation, and doubling operations on the plurality of running totals.

9. A method as in claim 1 wherein the term, ECC scalar multiplication result, is defined to mean the product of a scalar integer, n, by a point on an elliptic curve, the product of the scalar integer, n, by the point on the elliptic curve being defined by adding the point on the elliptic curve to itself n−1 times.

10. An integrated circuit chip comprising:
an interface portion for communicating with an external user interface;
a high speed on-chip cache, the cache being constructed and arranged to store:
the entire contents of an enhanced acceleration table (EAT), the EAT including a plurality of ordered sub-tables, each sub-table including a plurality of entries, each entry including a pair of coordinate values representing a point along an elliptic curve; and
instructions to be performed; and
a controller, the controller being constructed and arranged to perform instructions stored in the cache, wherein performing instructions stored in the cache includes:
(A) receiving, from the external user interface, an input value to be cryptographically processed;
(B) applying elliptic curve cryptography (ECC) based cryptographic processing to the input value to generate a cryptographically processed value, wherein:
(i) applying ECC-based cryptographic processing includes:

(a) performing ECC scalar multiplication to calculate an ECC scalar multiplication result with the EAT stored in the cache; and
(b) cryptographically processing the received input value according to an ECC based cryptographic processing algorithm using the calculated ECC scalar multiplication result to generate the cryptographically processed value;
(ii) calculating the ECC scalar multiplication result with the EAT includes:
(a) generating a plurality of running totals, each running total being associated with a positive integer multiplier; and
(b) calculating the sum of each running total multiplied by its associated positive integer multiplier, this sum being the ECC scalar multiplication result;
(iii) generating the plurality of running totals includes, for each sub-table of the plurality of sub-tables:
(a) adding a first value associated with an entry in that sub-table to a running total of the plurality of running totals; and
(b) carrying a second value to a next sub-table, except for the last sub-table of the plurality of ordered sub-tables; and
(iv) for one sub-table of the plurality of sub-tables, the running total is associated with a multiplier greater than 2; and
(C) outputting the generated cryptographically processed value via the user interface.

11. An integrated circuit chip as in claim 10 wherein the controller, when carrying the second value to the next sub-table for the one sub-table is configured to carry an integer value other than 0 or 1 to the next sub-table.

12. An integrated circuit chip as in claim 11 wherein:
the first value associated with the entry in the one sub-table is the pair of coordinate values stored in that entry; and
the second value carried to the next sub-table is a negative integer.

13. An integrated circuit chip as in claim 11 wherein:
the first value associated with the entry in the one sub-table is a negation of the pair of coordinate values stored in that entry; and
the second value carried to the next sub-table is a positive integer greater than 1.

14. An integrated circuit chip as in claim 11 wherein:
performing ECC scalar multiplication includes calculating a product of a scalar value and a given point on the elliptic curve, the given point being represented by an ordered pair of coordinate values, a bit-length of each coordinate value of the ordered pair being equal to a field size of an elliptic curve group based on the given point and the elliptic curve, wherein the scalar value also has the same bit-length;
the number of sub-tables in the EAT is defined by the bit-length divided by a window-size;
a binary representation of the scalar value is divided into an ordered set of subsets, each subset being a binary value having a length equal to the window-size, each subset corresponding to a particular sub-table in order; and
generating the plurality of running totals further includes selecting an entry in that sub-table associated with the binary value of the subset associated with that sub-table.

15. An integrated circuit chip as in claim 14 wherein:
the field size is 256;
the elliptic curve group is the NIST standard P256 elliptic curve group; and
the window-size is a fourth value chosen from the set $\{3, 4, 5, 6, 7, 8, 9, 10, 11, 12\}$.

16. A computer program product comprising a non-transitory computer readable medium, the non-transitory computer readable medium storing instructions thereon which when performed by a computer cause the computer to:
(A) receive, from a user interface, an input value to be cryptographically processed;
(B) apply elliptic curve cryptography (ECC) based cryptographic processing to the input value to generate a cryptographically processed value, wherein:
(i) applying ECC-based cryptographic processing includes:
(a) performing ECC scalar multiplication to calculate an ECC scalar multiplication result with an enhanced acceleration table (EAT), the EAT including a plurality of ordered sub-tables, each sub-table including a plurality of entries; and
(b) cryptographically processing the received input value according to an ECC based cryptographic processing algorithm using the calculated ECC scalar multiplication result to generate the cryptographically processed value;
(ii) calculating the ECC scalar multiplication result with the EAT includes:
(a) generating a plurality of running totals, each running total being associated with a positive integer multiplier; and
(b) calculating the sum of each running total multiplied by its associated positive integer multiplier, this sum being the ECC scalar multiplication result;
(iii) generating the plurality of running totals includes, for each sub-table of the plurality of sub-tables:
(a) adding a first value associated with an entry in that sub-table to a running total of the plurality of running totals; and
(b) carrying a second value to a next sub-table, except for the last sub-table of the plurality of ordered sub-tables; and
(iv) for one sub-table of the plurality of sub-tables, the running total is associated with a multiplier greater than 2; and
(C) output the generated cryptographically processed value via the user interface.

17. A computer program product as in claim 16 wherein the instructions for carrying the second value to the next sub-table for the one sub-table include instructions for carrying an integer value other than 0 or 1 to the next sub-table.

18. A computer program product as in claim 17 wherein:
the first value associated with the entry in the one sub-table is a value stored in that entry; and
the second value carried to the next sub-table is a negative integer.

19. A computer program product as in claim 17 wherein:
the first value associated with the entry in the one sub-table is a negation of a value stored in that entry; and
the second value carried to the next sub-table is a positive integer greater than 1.

20. A computer program product as in claim 17 wherein:
performing ECC scalar multiplication includes calculating a product of a scalar value and a given point on an elliptic curve, the given point being represented by an ordered pair of coordinate values, a bit-length of each coordinate value of the ordered pair being equal to a field size of an elliptic curve group based on the given point and the elliptic curve, wherein the scalar value also has the same bit-length;

the number of sub-tables in the EAT is defined by the bit-length divided by a window-size;

a binary representation of the scalar value is divided into an ordered set of subsets, each subset being a binary value having a length equal to the window-size, each subset corresponding to a particular sub-table in order; and generating the plurality of running totals further includes selecting an entry in that sub-table associated with the binary value of the subset associated with that sub-table.

21. A computer program product as in claim 20 wherein:
the field size is 256;
the elliptic curve group is the NIST standard P256 elliptic curve group; and
the window-size is a fourth value chosen from the set {3, 4, 5, 6, 7, 8, 9, 10, 11, 12}.

22. A computer program product as in claim 17 wherein calculating the sum of each running total multiplied by its associated positive integer multiplier consists of performing a series of nested addition and doubling operations on the plurality of running totals.

* * * * *